US006002359A

United States Patent [19]

Chen

[11] Patent Number: 6,002,359

[45] Date of Patent: Dec. 14, 1999

[54] ANTENNA SYSTEM FOR SATELLITE DIGITAL AUDIO RADIO SERVICE (DARS) SYSTEM

[75] Inventor: Chun-Hong Harry Chen, Torrance, Calif.

[73] Assignee: TRW Inc., Redondo Beach, Calif.

[21] Appl. No.: 08/874,743

[22] Filed: Jun. 13, 1997

[51] Int. Cl.[6] .................... H04B 7/185

[52] U.S. Cl. .................... 342/352; 343/895; 343/770

[58] Field of Search .................... 342/352, 354; 373/895, 767, 770, 771

[56] References Cited

U.S. PATENT DOCUMENTS

| | | | |
|---|---|---|---|
| 5,198,831 | 3/1993 | Burrell et al. . | |
| 5,327,150 | 7/1994 | Cherrette | 343/771 |
| 5,604,972 | 2/1997 | McCarrick | 343/895 |
| 5,635,945 | 6/1997 | McConnell et al. | 343/895 |

FOREIGN PATENT DOCUMENTS

| | | |
|---|---|---|
| 4213202 | 8/1992 | Japan . |
| 2 292 638 | 2/1996 | United Kingdom . |
| PCT/US85/ 02181 | 5/1986 | WIPO . |
| WO 96/03062 | 5/1986 | WIPO . |

OTHER PUBLICATIONS

M. C. D. Maddocks, et al., "Polarisation Converters For A DBS Flat–Pate Antenna," BBC Research Department Report, Jul. 988, pp. 1–8.

Richard C. Johnson, "Antenna Engineering Handbook", Chap. 9 Slot–antenna Arrays, McGraw–Hill 1993.

Richard C. Johnson, "Antenna Engineering Handbook", Section 23–5: Transmission–and Reflection–type Polarizers, pp. 23–25, McGraw–Hill 1993.

*Primary Examiner*—Theodore M. Blum
*Attorney, Agent, or Firm*—Michael S. Yatsko

[57] ABSTRACT

A digital audio radio service (DARS) antenna system is provided. The DARS antenna system includes a broadcast antenna mounted on a spacecraft. The broadcast antenna includes a slotted waveguide direct radiating array (SWDRA). The DARS antenna system also includes a mobile user receive antenna having a quadrifilar helix antenna (QHA). The DARS antenna system further includes a parallel plate polarizer arranged on the broadcast antenna for generating circular polarization. In an embodiment, the polarizer has a plurality of thin plates arranged perpendicular to the SWDRA surface. Broadcast antenna is optimized for overall system performance and is capable of high RF power and beam shaping. The DARS antenna system is also highly reliable and easily deployed from a spacecraft. An embodiment of the DARS antenna system of the present invention further includes "universal" model and "regional" model mobile antennas to easily accommodate personal travel and commuter needs.

28 Claims, 12 Drawing Sheets

(b) DEPLOYED (a) STOWED

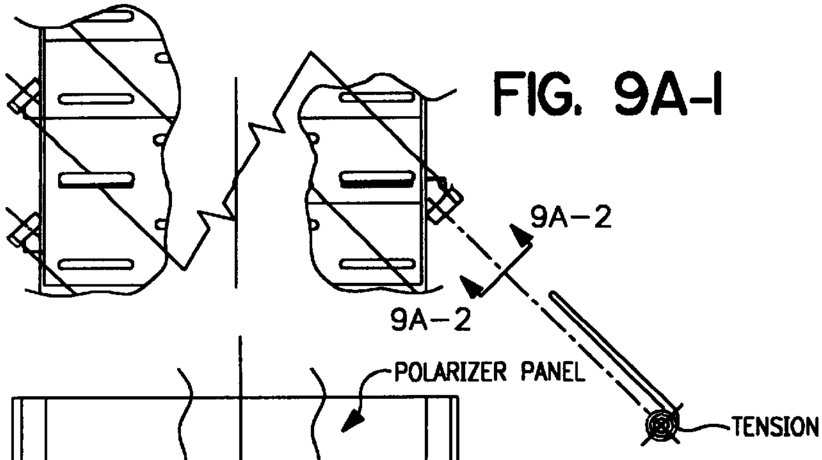
FIG. 9A-1
FIG. 9A-2
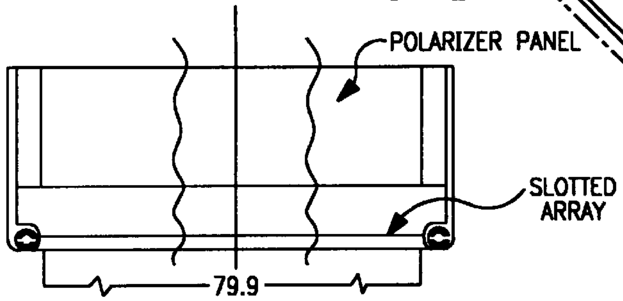
FIG. 9A-3
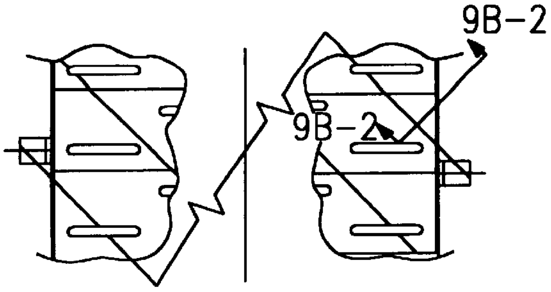
FIG. 9B-1
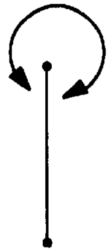
FIG. 9B-2
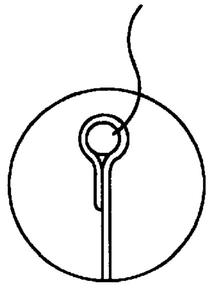
FIG. 9B-3
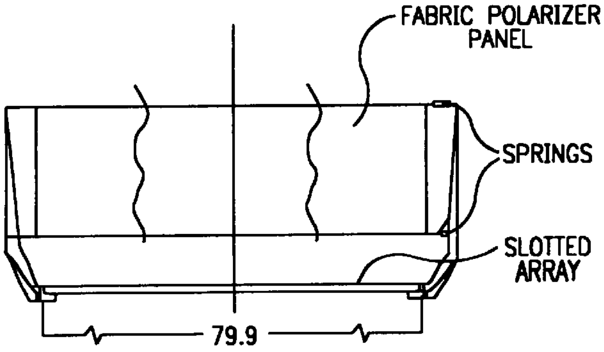
FIG. 9B-4
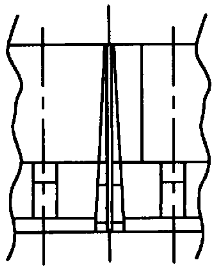
FIG. 9B-5

ANTENNA SYSTEM FOR SATELLITE DIGITAL AUDIO RADIO SERVICE (DARS) SYSTEM

BACKGROUND OF THE INVENTION

The present invention is generally related to antennas and in particular, a novel antenna system architecture and implementation that addresses the unique requirements of a digital audio radio service (DARS) system and optimizes the performance for the environment in which the system operates. Specifically, the antenna system described herein includes a downlink broadcasting antenna on board a spacecraft and a receive mobile antenna installed on various user vehicles or portable radios.

BRIEF SUMMARY OF THE INVENTION

A new breed of radio broadcasting system is on the horizon. The Federal Communications Commission (FCC) has set aside a portion of the airwaves for satellite digital audio radio service (DARS). DARS licensees will operate in the S-band, between 2,320 and 2,345 MHz, to provide continuous nationwide (i.e., CONUS—Continental United States) radio programming with digital CD-quality sound from two geosynchronous orbit slots. Antennas, including spacecraft broadcast antennas and user receive antennas, are essential and critical elements of the overall system. The antennas are essential since the system cannot operate without them, and critical because their configuration and implementation directly impact the system's performance and cost.

Key design drivers of mobile antennas for a DARS system are the physical attributes and production cost. The mobile antenna must be simple, light and small enough to be "consumer friendly." Commercial viability of the user radios depends heavily on the antenna appearance, installation and cost. An awkward and expensive antenna that requires more than just simple vehicle modification to install would not attract the interest of sufficient numbers of consumers to justify the large investment of a DARS system.

Equally important are the antenna's electrical performance characteristics. Because of the above physical and cost constraints, one cannot expect the mobile antennas to produce high gain. It is therefore essential that the beam peak points to the desired direction so that the gain-slope will not penalize the received signal quality. The look angles at geosynchronous satellites from CONUS are between 20 and 80 degrees from zenith. A radio is able to receive stronger signals if the antenna pattern is shaped to peak the gain between 20 and 80 degrees, as opposed to the conventional hemispherical coverage which peaks at zenith. In addition, the mobile antenna must be omni-directional in azimuth so that the received signals strength is insensitive to vehicle orientation. Other fundamental electrical characteristics include circular polarization (CP) and good polarization isolation per DARS system requirements.

Due to the low gain characteristic of mobile antennas and the large broadcasting area of a DARS system, an embodiment of a spacecraft antenna for the present invention must transmit very high power (in the range of 1.5 to 2.0 kilowatts) to ensure high fidelity audio signals received by users. To maximize the power transmitted to the area of interest (or minimize power spill-over into a non-coverage area), the beam coverage must be shaped to match the irregular shape of the broadcasted area.

As a result, high power handling capability and beam shaping capability are therefore two key design drivers of the spacecraft broadcasting antenna. Because of the high power, the antenna must possess good thermal dissipation/management properties. Because of the beam shaping requirement, the antenna must have aperture amplitude and phase adjustability. In addition, it is highly desired that the antenna can be conveniently packaged onto the same bus structure and share common thermal control and propulsion design with other commercial space programs (such as the Odyssey system developed by the assignee of this application). Doing so reduces the overall program cost. Simple on-orbit deployment and gimbals mechanisms are also preferred for reliability reasons.

The antenna architecture and implementation for satellite DARS system of the present invention provides the advantage of optimized overall system performance using the inherent beam coverage flexibility of mobile and spacecraft antennas.

Another advantage of the antenna system of the present invention is that it provides an efficient spacecraft antenna that is capable of high RF power and beam shaping.

A further advantage of the antenna system is high reliability from a simple deployment mechanism. An embodiment of the deployment mechanism includes a torsion spring to rotate the antenna into proper position, instead of a reflector-type antenna which must be deployed with a complicated umbrella-type deployment system which is very expensive and failure-prone.

Yet another advantage of the antenna system of the present invention is that it provides for simple mobile antenna installation requiring very minimum vehicle modification and low mobile antenna production cost.

A further advantage of the antenna system of the present invention is that the mobile antennas are easily swapped between a "universal" model and a "regional" model to accommodate a personal travel/commute profile.

An embodiment of a DARS antenna system is provided. The mobile user antennas are addressed first; followed by the spacecraft antenna; and lastly the system as a whole. Embodiments of the present invention may be used in satellite digital audio radio services, downlink antennas for GEO communication systems, spacecraft TT&C antennas and airborne communications and radar applications.

BRIEF DESCRIPTION OF THE SEVERAL VIEWS OF THE DRAWING

FIG. 3A illustrates a QHA designed to provide sufficient gain between 20° and 80° from zenith; FIG. 3B illustrates a QHA designed to provide high gain between 40° and 60° from zenith.

FIG. 9 is a perspective view of the lightweight polarizer for a deployable DARS spacecraft antenna: (a) deployable approach; and (b) suspension approach.

DETAILED DESCRIPTION OF THE INVENTION

Figure 1:
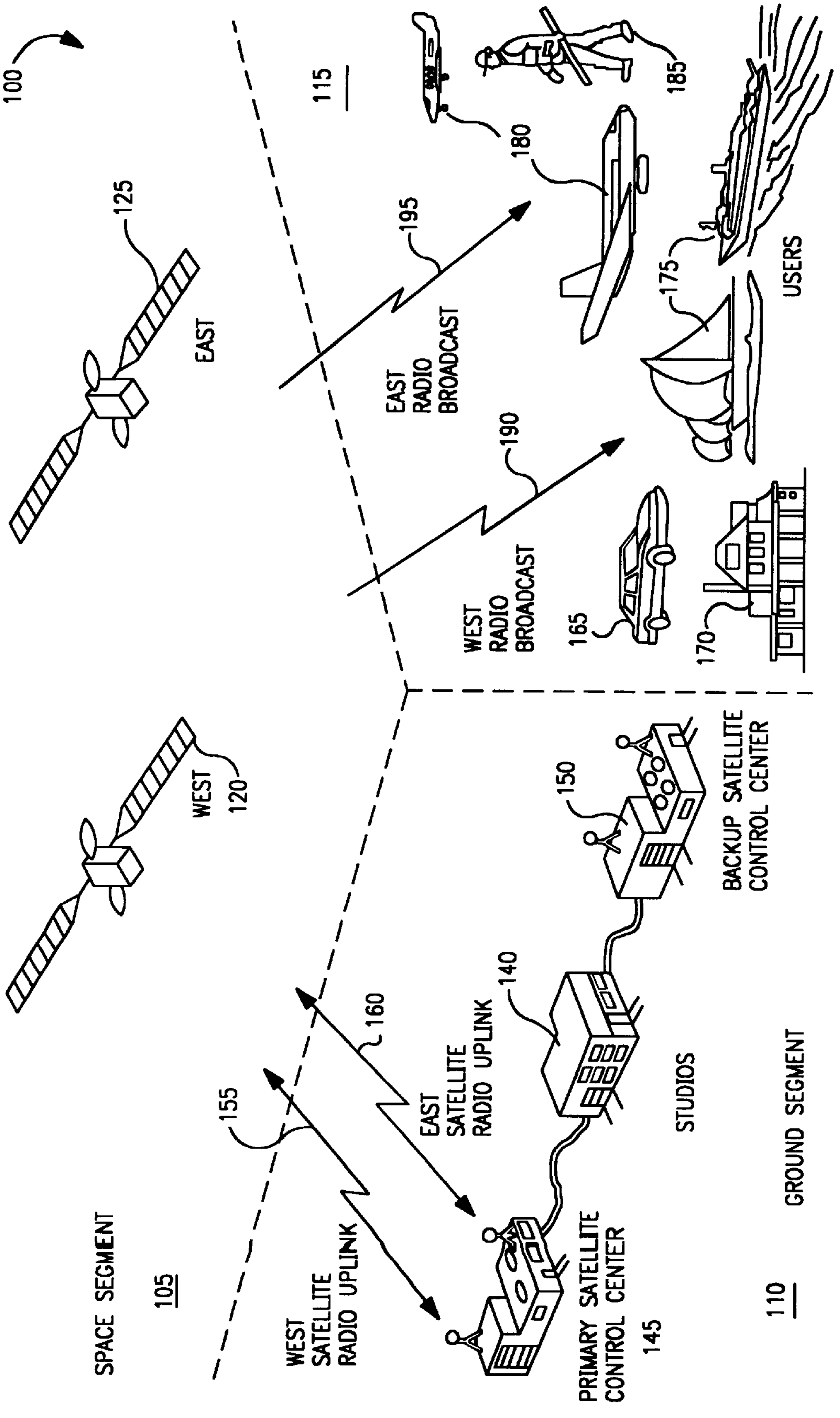
FIG. 1 is a diagrammatic illustration of an embodiment of a satellite Digital Audio Radio Service (DARS) system of the present invention.

The present invention provides an antenna system for use with a satellite digital audio radio service (DARS) system as discussed above. In particular, FIG. 1 illustrates an embodiment of a antenna system for a satellite DARS system indicated generally at 100. The antenna system 100 is divided into three primary segments. The first segment is a space segment 105, a second segment is a ground segment 110 and a third segment is a users segment 115. Included in the space segment 105 is a west satellite 120 and an east satellite 125. The satellites 120 and 125 provide coverage over the continental United States (CONUS). In addition, two satellites 120, 125 are used for redundancy and improving signal strength in certain instances. Also, for diversity reasons, the two satellites 120, 125 may broadcast the same signal such that the users receive both signals, with an appropriate time delay, for an improved quality summed signal.

The ground segment 110 includes studios 140 which are connected to a primary satellite control center 145 and also a backup satellite control center 150 for redundancy and reliability. The primary satellite control center 145 also provides a west satellite radio uplink 155 and an east satellite radio unlink 160 which communicate with the west satellite 120 and the east satellite 125, respectively.

The users segment 115 includes receiver antennas and radios in a variety of vehicles and devices. For example, FIG. 1 illustrates an automotive vehicle 165, a house or building 170, watercraft 175, aircraft 180, and individual pedestrian users 185. All the above users are possible users of the antenna system 100 of the DARS system. In addition, between the space segment 105 and the users segment 115, is a west radio broadcast 190 and an east radio broadcast 195 transmitted from the west satellite 120 and the east satellite 125 to the users respectively.

Figure 2A:
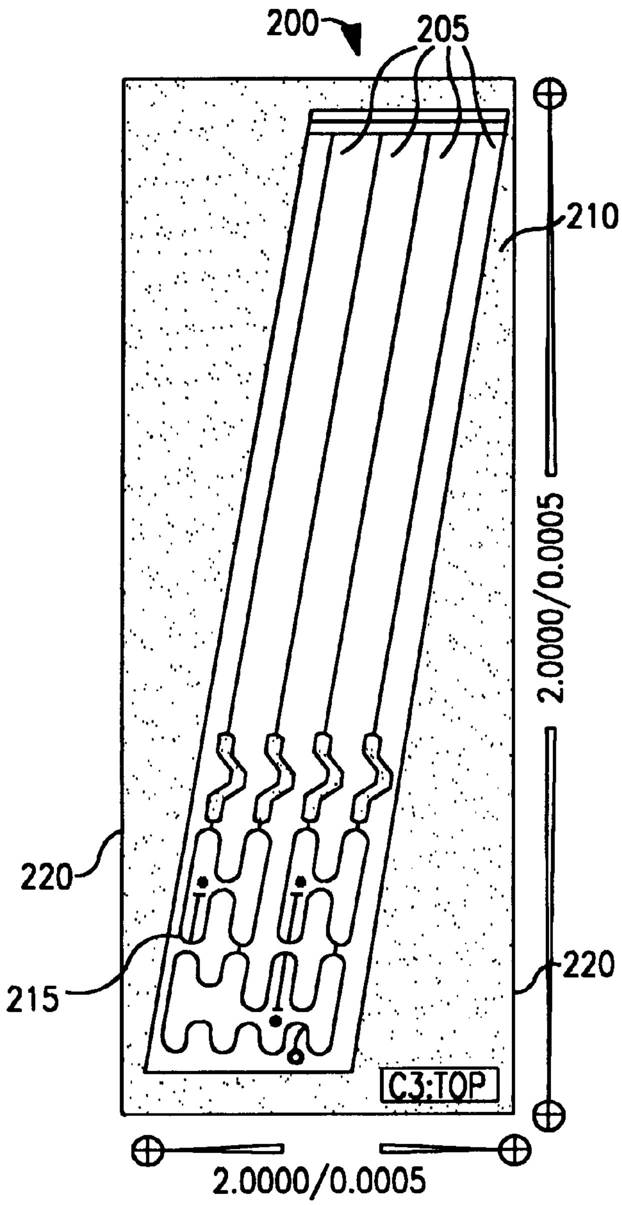
FIGS. 2A and 2B are respective front and back views of an embodiment of printed feed network for a quadrifilar helix mobile antenna (QHA) of the present invention.
Figure 2B:
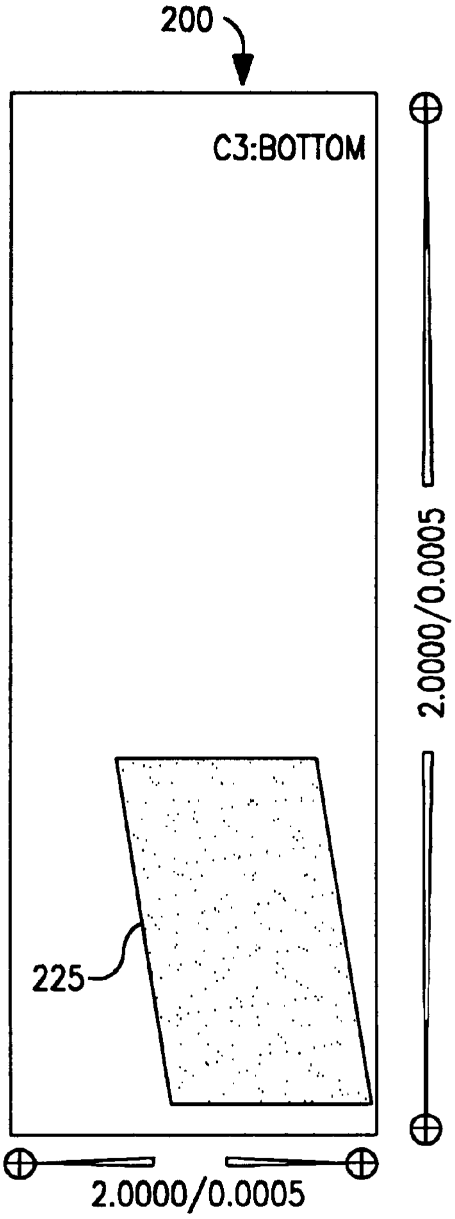

An embodiment of mobile antenna for the DARS radio is a printed circuit quadrifilar helix antenna (QHA) 200. Referring to FIGS. 2A and 2B, an embodiment of the QHA 200 includes four identical windings 205, equally spaced, on a cylindrical surface 210. The four helices 205 are fed by a microstrip balun 215 equally in amplitude and with 90-degree phase progression. Both the helices 205 and the balun 215 are fabricated on the same thin dielectric circuit sheet 220 using standard photo-etching printed circuit processes. The circuit sheet 220 is then wrapped around a tube for mechanical support. The complete assembly is less than 4" in length and 0.4" in diameter. FIG. 2B illustrates a ground plane 225.

Such a printed circuit design with integrated balun allows the use of standard photo-etching fabrication for low cost volume production. The slim and small physical size creates negligible wind loading and therefore needs only simple base mounting. Alternatively, the mobile antenna 200 can be added onto an existing AM/FM antenna.

Figure 3A:
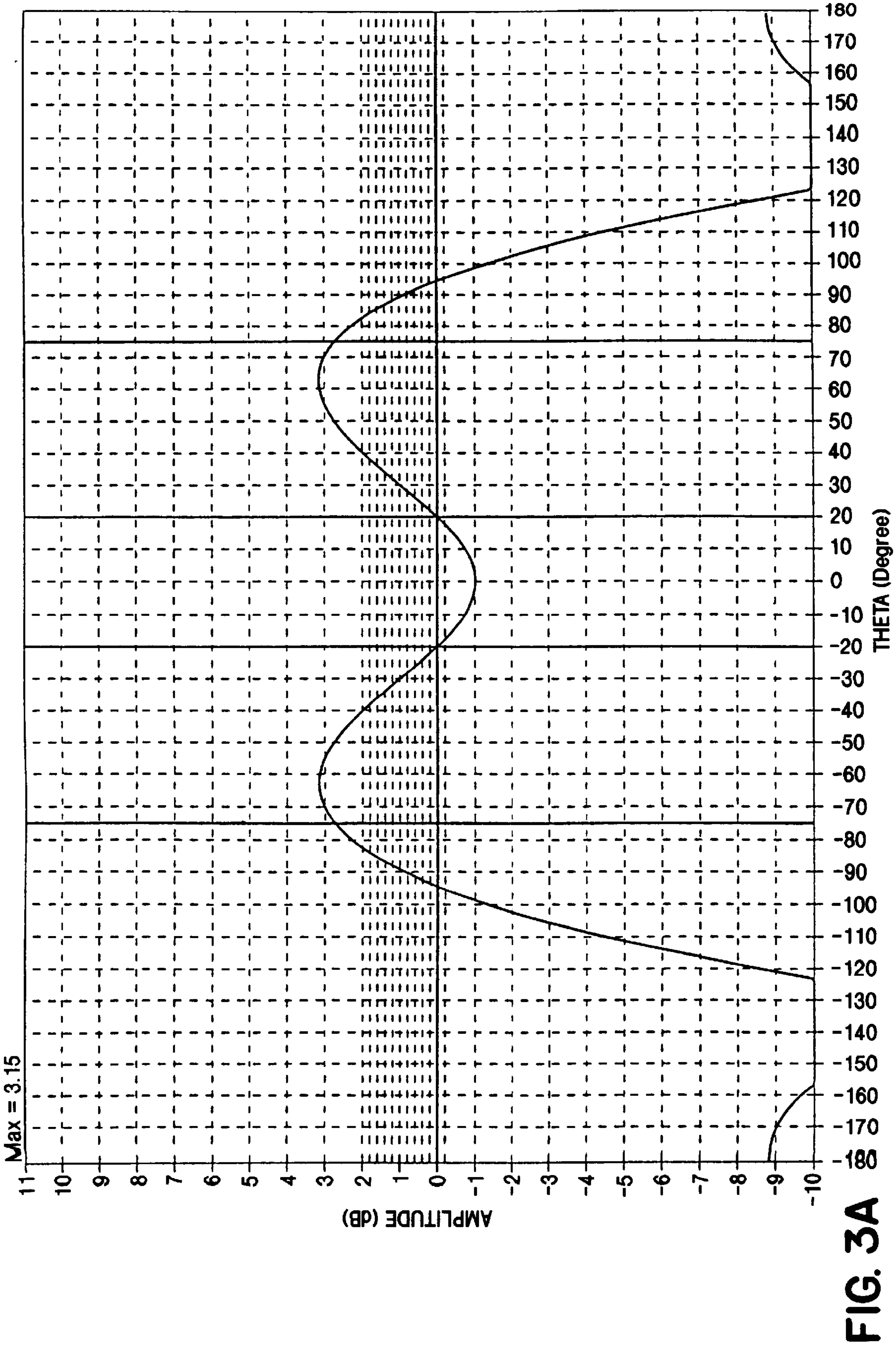
FIGS. 3A and 3B are graphical illustrations of computed patterns of embodiments of quadrifilar helix antennas (QHA) of different length and pitch.
Figure 3B:
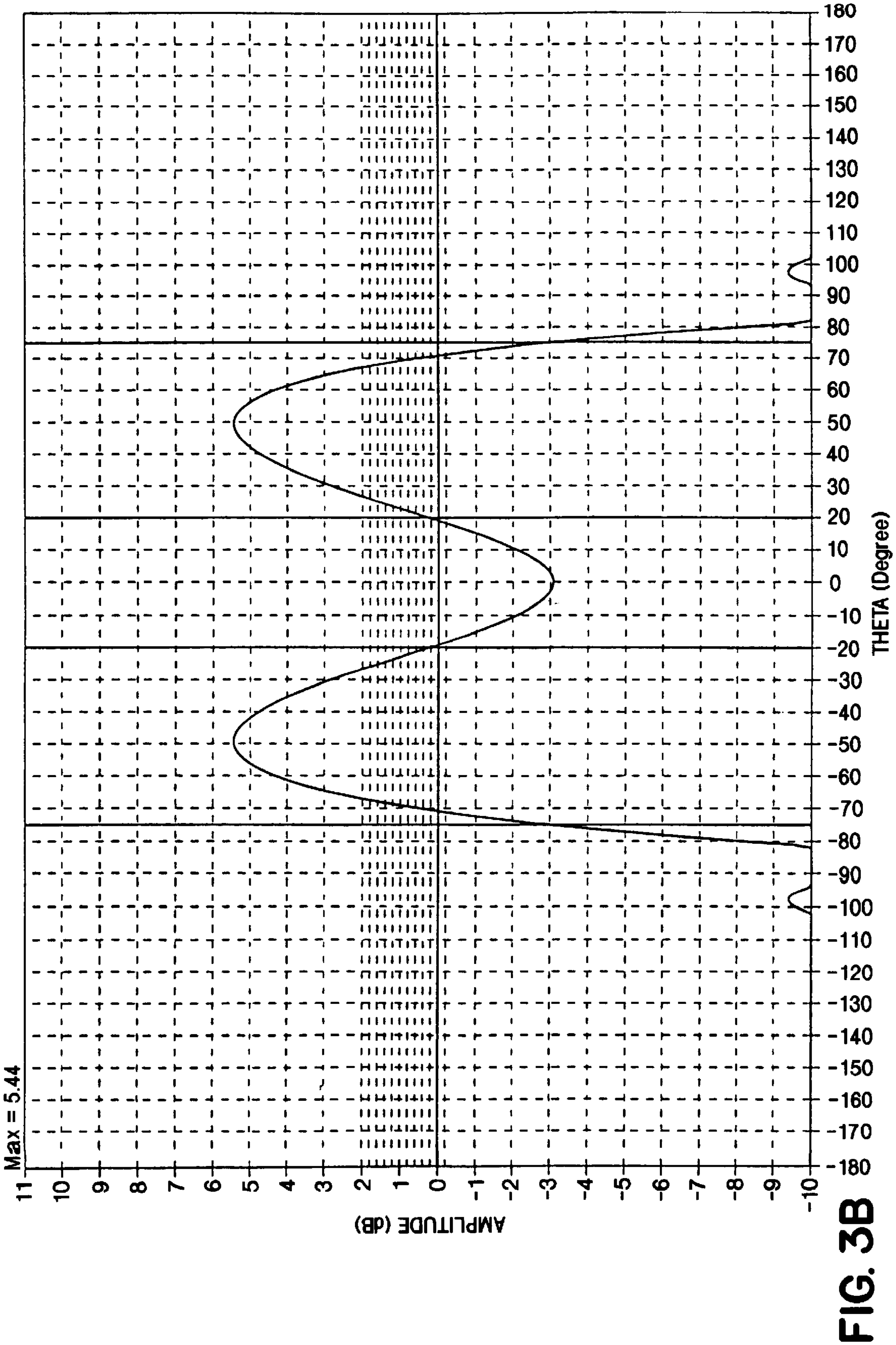

Beam shaping is achieved by varying the length and pitch of the helices 205. FIG. 3A and 3B show the computed patterns of quadrifilar helix antennas of different length and pitch. The antenna 200 with pattern of FIG. 3A provides good gain coverage from 20° to 80° from zenith and is suitable for anywhere in CONUS. For example, within CONUS different states have different elevations or degrees from zenith. States like Florida are approximately 20°–30° from zenith and states like North Dakota are approximately 60°–70° from zenith (see FIG. 6). For those relatively localized users, the longer antenna with gain peak at proper look angle (see FIG. 3B) can be used to enhance the received signal quality.

The electrical performance of the DARS system is further enhanced, and the product cost further reduced, by the helical antenna's 200 self-polarization characteristic. The self-polarizing characteristic eliminates a need for a polarizer circuit required in other antenna configurations (such as microstrip patches) to generate CP. As a result, the additional loss and cost associated with the polarizer is also eliminated. The radio performance is further enhanced by integrating front-end low noise amplifier (LNA) directly into the antenna base. This eliminates the high loss due to the long cable. The LNA is generally the first stage in the receiving system. It is advantageous to minimize the loss between the antenna and the LNA since any loss between the two directly impacts the SNR. For example, one dB loss before the LNA will result in a one dB decrease in the SNR.

Figure 4B:
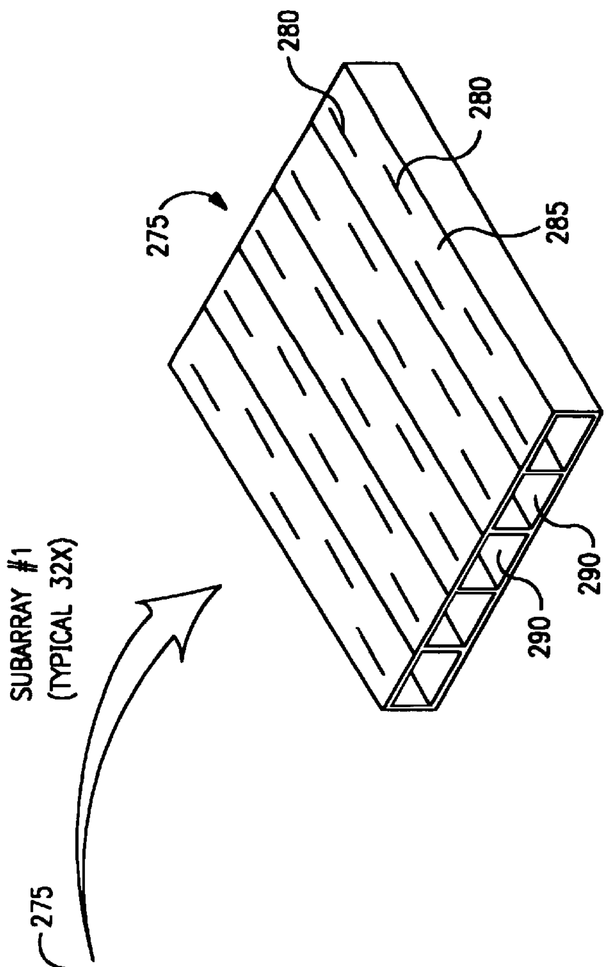
FIG. 4B is a perspective view of a subarray of the SWDRA array of FIG. 4A.
Figure 4A:
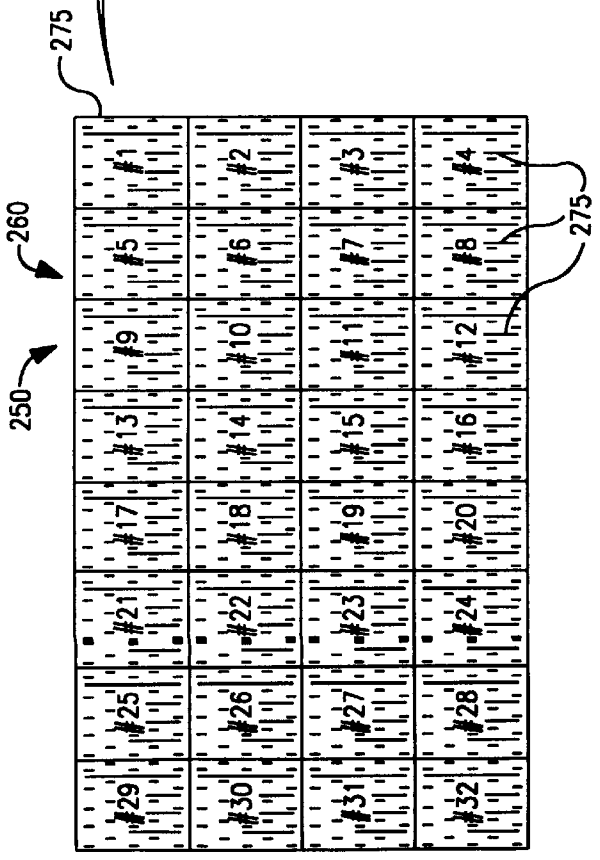
FIG. 4A is a top view of an embodiment of a Slotted Waveguide Direct Radiating Array (SWDRA) arrangement for a DARS application of the present invention.
Figure 5A:
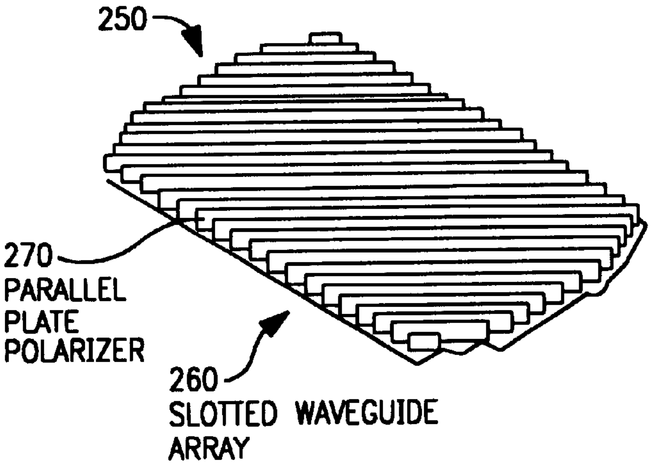
FIG. 5A is a top perspective view of a parallel-plate polarizer, slotted waveguide array and waveguide feed network for the embodiment of the SWDRA of FIGS. 4A and 4B.
Figure 5B:
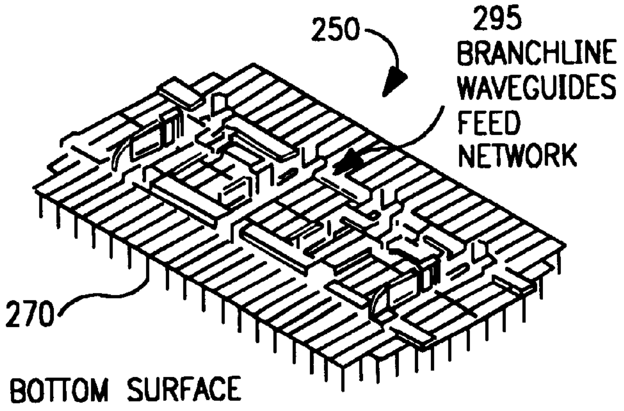
FIG. 5B is a bottom perspective view of the embodiment of FIG. 5A.

An embodiment of a spacecraft antenna 250 for the DARS system 100 of the present invention is illustrated in FIGS. 4A, 4B, 5A and 5B. The spacecraft antenna 250 includes a slotted waveguide direct radiating array (SWDRA) 260 with parallel plate polarizer 270 (FIG. 5A) for generating CP. As shown in FIG. 4A, the baseline antenna 250 consists of 32 (4×8) subarrays 275. As shown in FIG. 4B, each subarray 275 has 25 (5×5) slots 280 cut on a broad wall 285 of each of five waveguides 290. A waveguide network of branchline couplers 295 on a back side of the array connects all 32 subarrays 275 (FIG. 5). A shaped CONUS beam is generated by setting proper excitation amplitude at every element (slot) and excitation phase at every subarray 275. The uniform phase within the subarray 275 (as opposed to phase variation from element to element) drastically simplifies the manufacturing without significant performance degradation.

Figure 6:
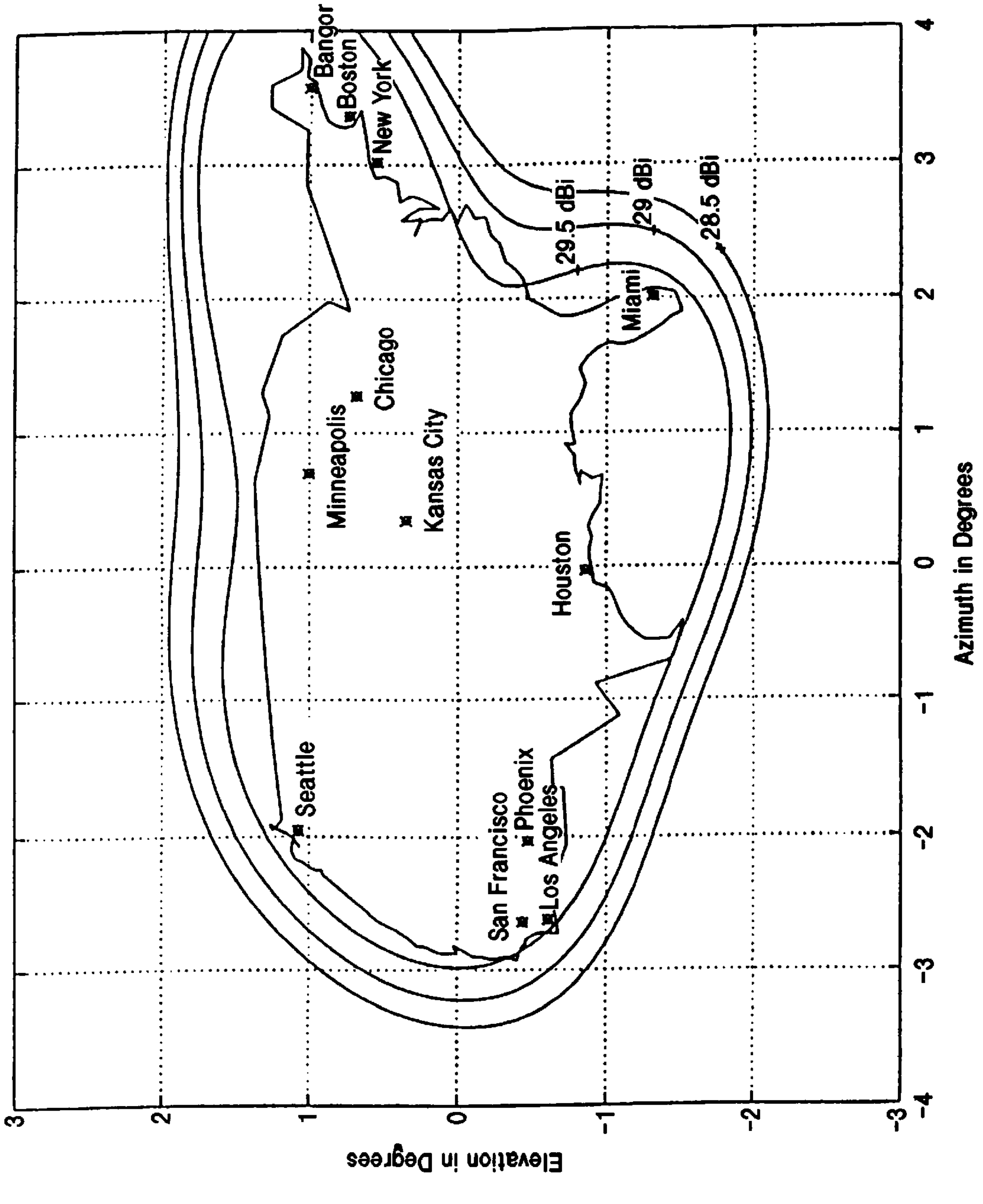
FIG. 6 is a diagrammatic view of a gain contour of a DARS system from 80° longitude orbit slot that provides quasi-uniform coverage within CONUS.
Figure 7A:
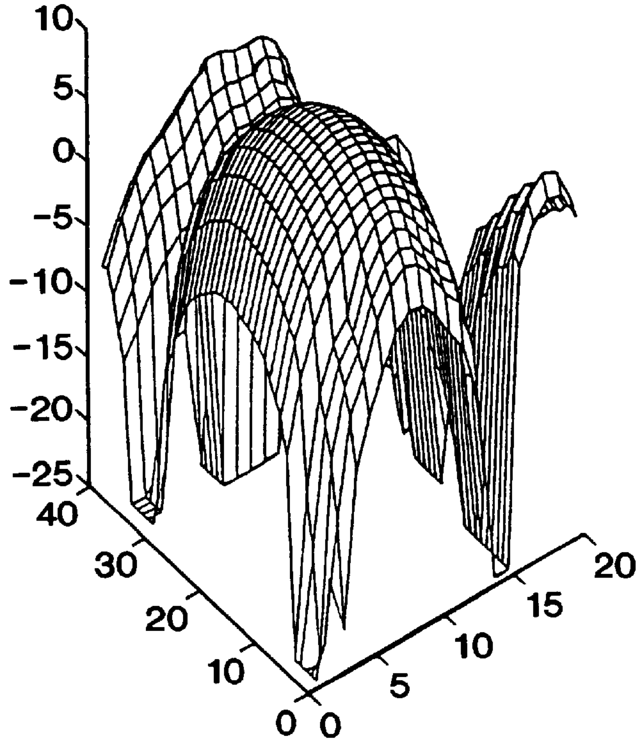
FIG. 7A is a graph illustrating aperture amplitude of the SWDRA to generate the beam coverage of FIG. 6.
Figure 7B:
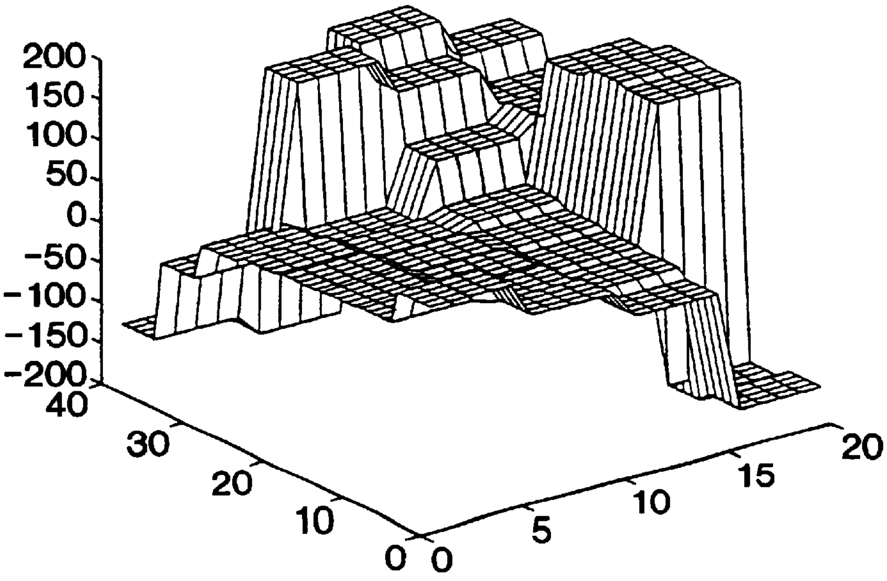
FIG. 7B is a graph illustrating phase distribution of the SWDRA to generate the beam coverage of FIG. 6.

An example CONUS beam coverage is illustrated in FIG. 6. FIG. 6 is generated assuming that a satellite is located at the orbit slot of 80° W longitude. The aperture amplitude and phase distribution used to generate the coverage shape of FIG. 6 are shown in FIG. 7. In particular, FIG. 7A illustrates a graphical representation of the aperture amplitude, while FIG. 7B shows the phase distribution. The objective of this design is to achieve near-uniform coverage in CONUS. However, some systems may not require coverage in Florida, for example. Different design objectives will lead to a different set of aperture distributions and therefore different coverage shapes, as discussed below.

The antenna's waveguide structure (usually constructed in aluminum or metalized composite material) inherently possesses the property of high conductivity, both electrical and thermal. The high electrical conductivity minimize the RF power loss due to ohmic loss. Therefore, the antenna 250 is highly efficient. The high thermal conductivity, augmented by the large aperture area, enables effective dissipation of excessive heat (if any). The embodiment of the spacecraft antenna 250 therefore is able to handle very high RF power as needed in the DARS system 100.

Figure 8B:
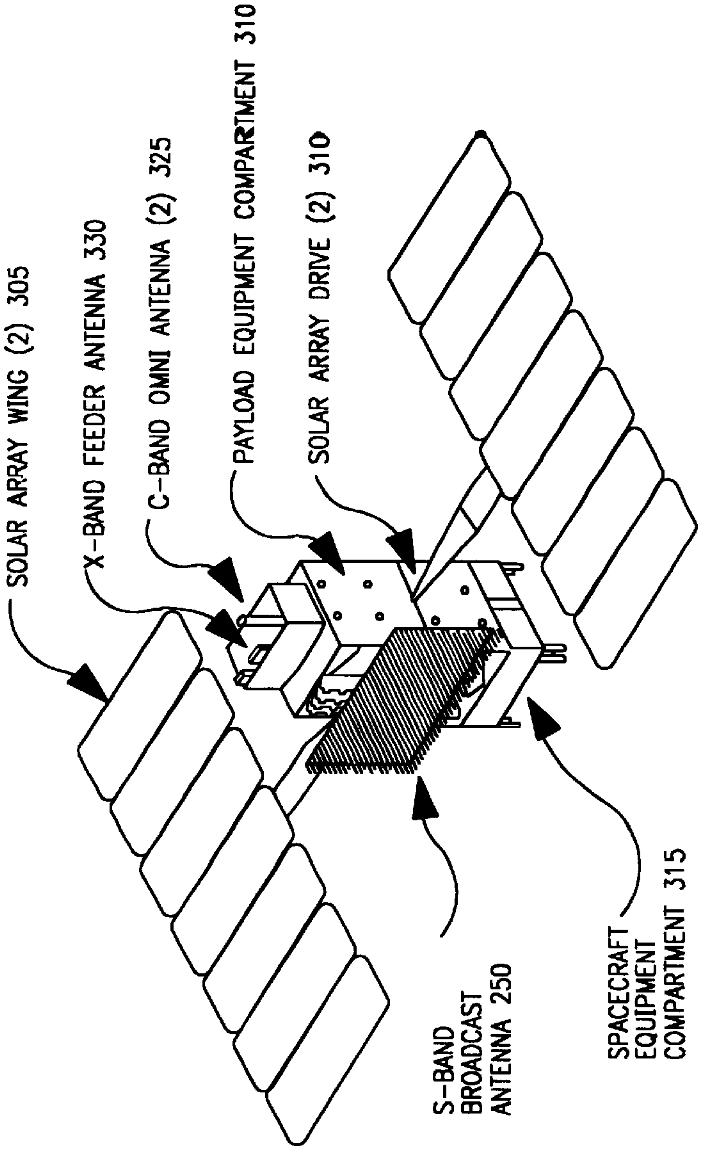
FIG. 8B is a perspective view of the SWDRA illustrating an on-orbit deployed position of the SWDRA of the present invention.
Figure 8A:
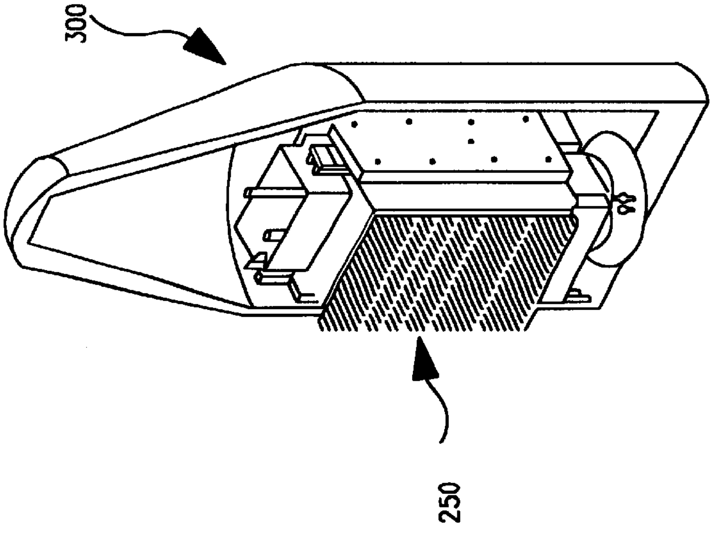
FIG. 8A is a perspective view of the SWDRA illustrating a stowed position during launch of a spacecraft.

FIG. 8A illustrates how an embodiment of the SWDRA 260 is packed onto a spacecraft 300 in the stowed position during launch. The spacecraft antenna 250 can be easily deployed on orbit by a simple rotation mechanism (such as a torsion spring) around the spacecraft's yaw-axis as described below.

FIG. 8B illustrates the spacecraft 300 in a deployed on-orbit orientation. The S-band broadcast antenna 250 is illustrated in a deployed position. As can be seen with reference to FIG. 8A, the broadcast antenna is rotated 90° from its stowed position during launch. The spacecraft 300 also includes solar array wings 305 connected by a solar array drive 310 to the spacecraft 300. The spacecraft 300 also includes a payload equipment compartment 315 and a spacecraft bus equipment compartment 320. Further, a C band omni antenna 325 and a K band feeder antenna 330 are also provided.

The embodiment of the spacecraft antenna 250 includes the SWDRA 260 which uses the parallel plate polarizer 270 to provide CP needed in the DARS system 100. Again, a metal such as aluminum or metalized composite material can be used to construct the polarizer 270 to achieve high power handling and good thermal management. Key electrical design considerations of the polarizer 270 are two-fold: one, the polarizer 270 should be capable of generating CP of good polarization purity; and second, the presence of the polarizer 270 in front of the SWDRA 260 shall not significantly perturb the aperture distribution, which will change the coverage shape. The fact that the parallel plates are perpendicular to the SWDRA 260 surface (see FIGS. 5A and 5B) suggests that the perturbation will be insignificant if the plates are kept very thin. Applicants have proven this to be true. Thin plates also help the weight control of the entire spacecraft antenna 250.

However, the thin plates must be sufficiently strong to overcome any structure stiffness concerns. The thin and long plates must survive acoustic and random vibration during a launch. Once deployed on orbit, the thin plates are less of a concern because the antenna 250 is operated in a fairly stationary condition.

Embodiments of several designs of the present invention address this issue. For example, FIG. 9 illustrates two potential embodiments of the polarizer. For example, an embodiment shown in FIG. 9(*b*) includes torsion spring hinges at one end of the plates. All plates, which are folded down and secured during launch to survive the vibration, will spring up on orbit after antenna deployment.

The DARS 100 system uses two satellites at two orbit slots (e.g. 80° W and 110° W) for redundancy and diversity. CONUS presents different shapes to satellites at different orbit locations. A SWDRA designed for 80° will not properly cover the CONUS from 110°. The optimum performance is obtained by two antenna designs, one for each orbit location. Alternately, a common design can be used at both orbit locations for cost savings (mainly non-recurring cost), but at the expense of slight gain degradation on the order of 0.5 dB in corner regions (such as New England).

A unique operating environmental characteristics of the DARS system 100 is its diverse and dynamic propagation environments. Satellite communications/broadcasting relies on clear line-of-sight transmission. It is known that buildings and trees absorb microwave signals. The satellite DARS system 100 operates at relatively higher frequencies than those presently used for terrestrial cellular or radio/TV transmissions. Attenuation by atmosphere or vegetation is greater at higher frequencies. Transmission impairment can also result from reflections, multipath fading, black body radiation from adjacent structures, and RF interference from other services operating in the same or adjacent bands. For broadcasting to a fixed point, this problem can be easily alleviated by judiciously selecting a receiving site of clear line-of-sight. In the DARS system 100, the situation is complicated by the vehicle mobility. As a result, the propagation environment between the satellites in the space segment 105 and the users 115 is diverse and dynamic as shown in FIG. 1.

Statistically, mobile users in high latitude areas experience the above-mentioned transmission impairment more often because their low elevation looking angle at the satellite and therefore obstruction in the line-of-sight. The beam shaping capability built in the antenna architecture of the present invention provides several options to balance received signals quality between a low latitude area and high latitude area. These options can be employed in combination or separately.

For example, a first option is a "universal" model of the mobile antenna that is designed to favor low elevation angles (see FIG. 3A) while maintaining sufficient gain for satisfactory reception from 20° to 80° from zenith (70 to 10 degree elevation angle). The "universal" mode is intended for use everywhere in CONUS.

A second option includes providing several "regional" models of the mobile antenna that are offered to those users whose travel/commute areas are fairly localized. The regional model provides relatively higher gain in only a certain range of elevation angles and may not be suitable for use outside the specified region (see FIG. 3B). The regional model mobile antenna is thus tailored for the region of use. As explained above, users in North Dakota would have a regional antenna with a gain peak of 70°, and users in Florida would have a regional antenna with a gain peak of 20°. Thus, the gain is higher at the appropriate angle so the reception quality is better for the particular region. Antenna swapping by the users between the "universal" model and the "regional" models is a simple matter of unscrewing/screwing the mobile antenna 200.

Figure 10:
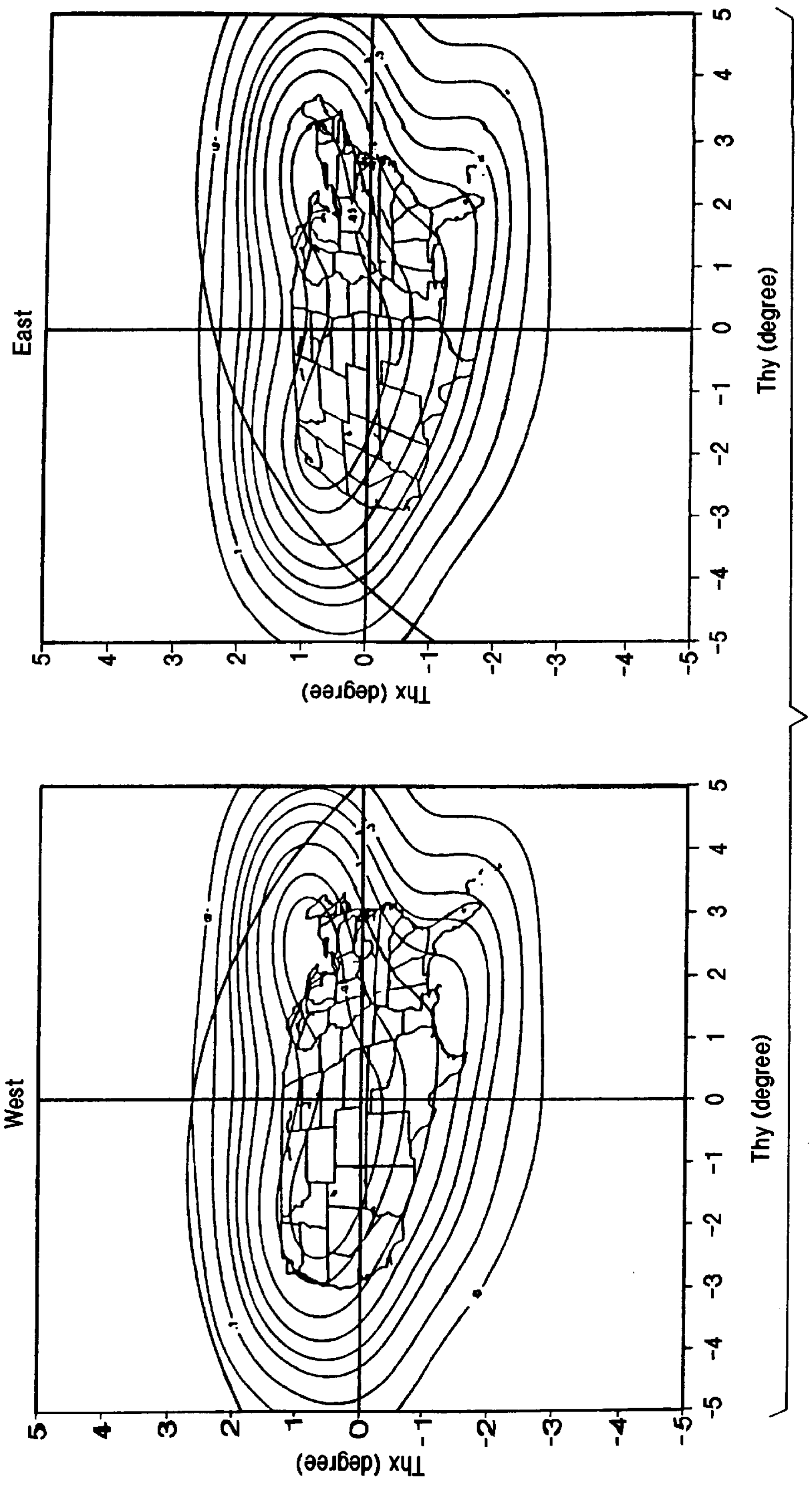
FIG. 10 is a graph illustrating the gain contours of a SWDRA design that favors high latitude region to compensate for transmission impairment due to relatively more frequent line-of-sight obstruction.
Figure 11A:
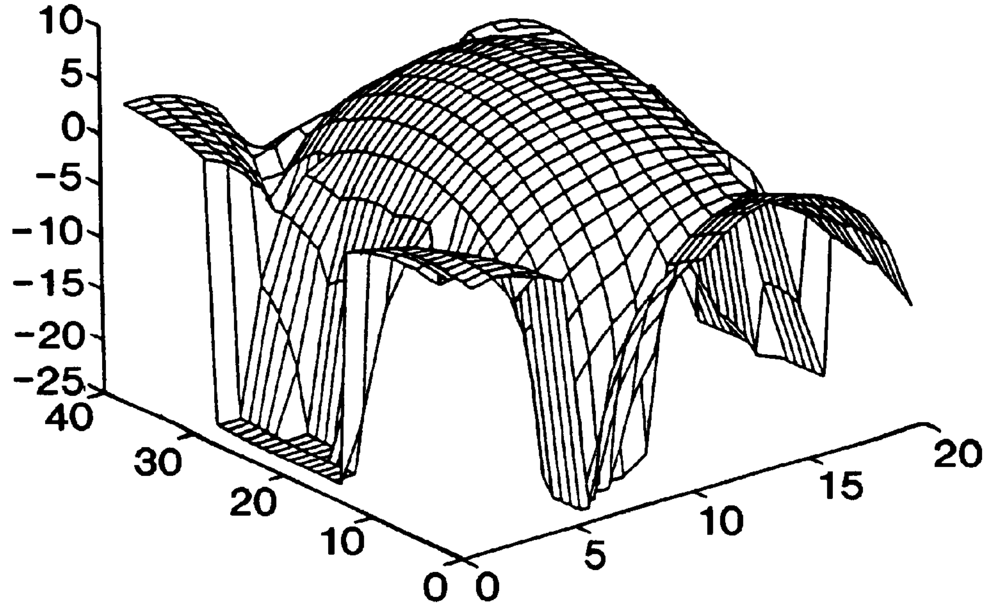
FIG. 11A is a graph illustrating aperture amplitude of the SWDRA to generate the beam coverage of FIG. 10.
Figure 11B:
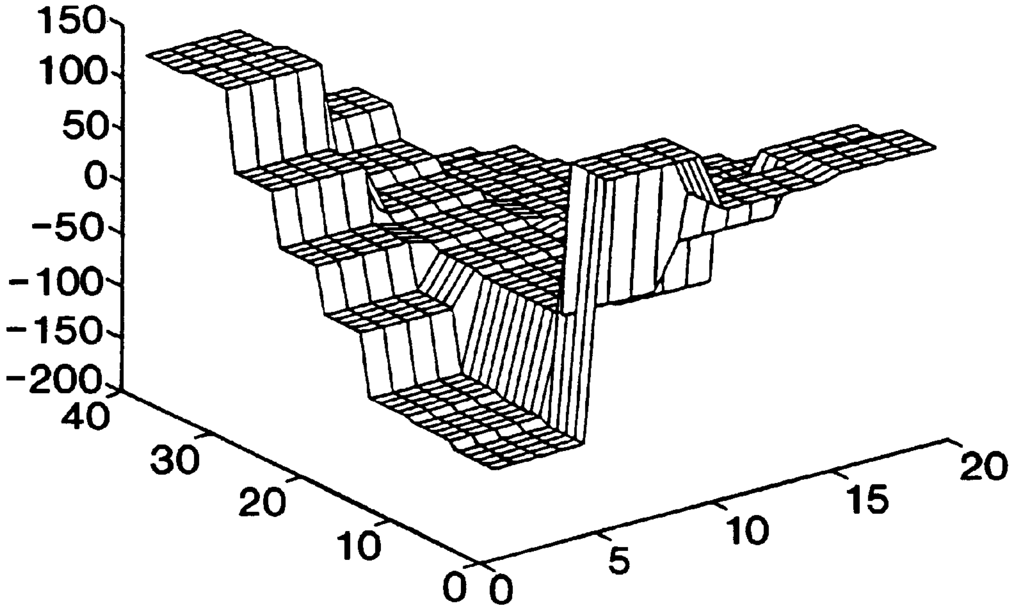
FIG. 11B is a graph illustrating a phase distribution of the SWDRA to generate the beam coverage of FIG. 10.

A third option is that the spacecraft antenna is designed to favor the high latitude region, for example, states like Montana and North Dakota, as opposed to the near-uniform coverage of the CONUS of FIG. 6. FIG. 10 illustrates one example of this type of coverage assuming a common design for both east and west orbit locations. The aperture amplitude and phase distribution required to generate the coverage of FIG. 10 are shown in FIG. 11, where aperture amplitude is shown in FIG. 11A and phase distribution is shown in FIG. 11B.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

I claim:

1. A digital audio radio service (DARS) antenna system comprising:

a broadcast antenna mounted on a spacecraft, the broadcast antenna including a slotted waveguide direct radiating array (SWDRA); and a mobile user receive antenna including a quadrifilar helix antenna (QHA).

2. The DARS antenna system of claim 1 further comprising:

a parallel plate polarizer arranged on the broadcast antenna for generating circular polarization (CP).

3. The DARS antenna system of claim 2 wherein the parallel plate polarizer comprises a plurality of thin plates arranged perpendicular to the SWDRA surface.

4. The DARS antenna system of claim 1 wherein the broadcast antenna transmits at a power level of approximately 1.5 kilowatts.

5. The DARS antenna system of claim 1 wherein the broadcast antenna shapes a transmit beam to approximate a shape of a broadcast area.

6. The DARS antenna system of claim 1 wherein the DARS antenna system operates in the S-band between 2,320 MHz and 2,345 MHz.

7. The DARS antenna system of claim 1 wherein the DARS antenna system provides digital audio from at least two geosynchronous orbit slots.

8. The DARS antenna system of claim 1 wherein the broadcast antenna has adjustable phase.

9. The DARS antenna system of claim 1 wherein the broadcast antenna has adjustable aperture amplitude.

10. The DARS antenna system of claim 1 wherein the broadcast antenna has high thermal and electrical conductivity.

11. The DARS antenna system of claim 1 wherein the broadcast antenna is constructed in aluminum.

12. The DARS antenna system of claim 1 wherein the broadcast antenna is constructed in a metalized composite material.

13. The DARS antenna system of claim 1 further comprising:

a rotation mechanism to deploy the broadcast antenna on orbit from the spacecraft.

14. The DARS antenna system of claim 13 wherein the rotation mechanism comprises a torsion spring.

15. The DARS antenna system of claim 1 wherein the SWDRA further comprises:

a first plurality of subarrays each having a second plurality of slots cut in walls of a third plurality of waveguides.

16. The SWDRA of claim 15 wherein the first plurality is 32, the second plurality is five and the third plurality is five.

17. The DARS antenna system of claim 15 further comprising:

a waveguide network of branchline couplers connecting the first plurality of subarrays.

18. The DARS antenna system of claim 1 further comprising:

a printed circuit QHA having four identical helical windings equally spaced on a cylindrical surface.

19. The DARS antenna system of claim 18 further comprising:

a microstrip balun feeding the four for helical windings equally in amplitude and with 90° phase progression, the four helical windings and the balun fabricated on a single thin dielectric circuit sheet using standard photoetching printed circuit processing techniques.

20. The DARS antenna system of claim 19 wherein the circuit sheet is wrapped around a tube.

21. The DARS antenna system of claim 1 wherein the QHA is approximately four inches long and 0.4 inches in diameter.

22. The DARS antenna system of claim 1 wherein the QHA is self-polarizing.

23. The DARS antenna system of claim 1 wherein the mobile antenna has an antenna pattern shaped to peak gain between 20° and 80° from zenith.

24. The DARS antenna system of claim 1 wherein the mobile antenna is azimuthally omni-directional.

25. The DARS antenna system of claim 1 further comprising:

integrated front-end LNA directly into a mobile antenna base.

26. The DARS antenna system of claim 1 further comprising:

a universal model of the mobile antenna favoring low elevation angles and providing reception from elevational angles of 70°–10°.

27. The DARS antenna system of claim 1 further comprising a regional model of the mobile antenna having a relatively higher gain at a preselected range of elevation angles.

28. The DARS antenna system of claim 1 wherein the mobile antenna is removable and replaceable.

* * * * *